United States Patent
Jo et al.

(10) Patent No.: US 11,091,665 B2
(45) Date of Patent: Aug. 17, 2021

(54) CLEAR COMPOSITION FOR ALUMIUM FOOT REST AND COATING METHOD FOR ALUMINIUM FOOT REST

(71) Applicants: Hyundai Motor Company, Seoul (KR); KIA Motors Corporation, Seoul (KR)

(72) Inventors: Gyeong-Wan Jo, Gyeongsangnam-do (KR); Jae-Sung Heo, Gyeonggi-do (KR); Chang-Yeol Yoo, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 184 days.

(21) Appl. No.: 16/201,231

(22) Filed: Nov. 27, 2018

(65) Prior Publication Data
US 2019/0352532 A1    Nov. 21, 2019

(30) Foreign Application Priority Data
May 18, 2018    (KR) .................. 10-2018-0057050

(51) Int. Cl.
| | |
|---|---|
| *C09D 167/00* | (2006.01) |
| *C09D 133/04* | (2006.01) |
| *C25D 11/18* | (2006.01) |
| *C25D 9/02* | (2006.01) |
| *C25D 11/16* | (2006.01) |
| *C09D 7/61* | (2018.01) |

(52) U.S. Cl.
CPC ............. *C09D 167/00* (2013.01); *C09D 7/61* (2018.01); *C09D 133/04* (2013.01); *C25D 9/02* (2013.01); *C25D 11/16* (2013.01); *C25D 11/18* (2013.01)

(58) Field of Classification Search
CPC .......... C08K 2003/2241; C09D 5/4411; C09D 5/4469; C09D 5/4473; C09D 7/61; C09D 133/04; C09D 133/06; C09D 167/00; C25D 11/04; C25D 11/08; C25D 11/16; C25D 11/18; C25D 11/246; C25D 9/02; C25D 13/12; C25D 13/20
USPC .................................................... 522/81, 167
See application file for complete search history.

(56) References Cited

U.S. PATENT DOCUMENTS

| | | | |
|---|---|---|---|
| 6,676,999 B2 * | 1/2004 | Valet .................... | C09D 167/00 427/487 |
| 6,906,136 B2 * | 6/2005 | Pourreau ............ | C08G 18/6216 522/95 |
| 2008/0107841 A1 * | 5/2008 | Remillard ................ | C09D 7/70 428/29 |

FOREIGN PATENT DOCUMENTS

KR    100485416 B1    11/2005

* cited by examiner

*Primary Examiner* — Sanza L. McClendon (57) ABSTRACT

The present invention relates to a clear composition for the aluminum foot rest containing a melamine resin, an acrylic resin, an ultraviolet (UV) curing agent, a solvent, and titanium oxide ($TiO_2$) powder in a content of 10 to 20% based on a total weight. Provided is the clear composition for the aluminum foot rest having an increased hardness, transparency and enhanced adhesion to the aluminum material.

4 Claims, 13 Drawing Sheets

CLEAR COMPOSITION FOR ALUMIUM FOOT REST AND COATING METHOD FOR ALUMINIUM FOOT REST

CROSS-REFERENCE TO RELATED APPLICATION

This application claims priority to Korean Patent Application No. 10-2018-0057050, filed on May 18, 2018, the entire contents of which are incorporated herein by reference.

FIELD

The present disclosure relates to a clear composition applied to a foot rest of aluminum material, and a coating method for the foot rest.

BACKGROUND

The statements in this section merely provide background information related to the present disclosure and may not constitute prior art.

Application of aluminum material to interior outfit components of a vehicle is gradually increasing in accordance with a need for a high quality vehicle.

Aluminum may be applied to a foot rest for supporting a driver's foot not in use to relax, or to an accelerator pedal and a brake pedal for a driving operation. For example, the surface of the foot rest of the aluminum material has been anodized and coated with a clear paint conventionally in order to increase the surface durability.

We have discovered that such a conventional clear layer protects the aluminum surface poorly and thus may peel off, or allow for surface contamination, corrosion and the like when a user steps on the foot rest or a pedal cover with strength In some instances, a scratch-resistant material with increased hardness have been made by adding a silicon carbide (SiC) ingredient as compared to the conventional clear layer.

However, SiC particles have a strong property to aggregate with one another, and have a tendency not to disperse easily in an acrylic resin, and thus produce a defect changing a transparent color of a clear to be opaque.

SUMMARY

The present disclosure describes a clear composition for an aluminum foot rest having increased hardness, transparency and enhanced adhesion to aluminum material, and a coating method for the aluminum foot rest.

In accordance with one form of the present disclosure, a clear composition for an aluminum foot rest contains: a melamine resin, an acrylic resin, an ultraviolet (UV) curing agent, a solvent, and titanium oxide ($TiO_2$) powder in a content of 10% to 20% based on a total weight.

The clear composition may further contain a polyester resin in a content of 20% to 25% based on a total weight.

The clear composition may further contain an epoxy resin in a content of 10 to 20% based on a total weight.

The UV curing agent may be present at a content of 1% or less based on a total weight.

The acrylic resin may be present at a content of 25% based on a total weight.

In accordance with an aspect of the present disclosure, a coating method for an aluminum foot rest may include: removing surface foreign materials of the aluminum foot rest; performing an anodizing treatment; and performing an electro-deposition coating with a clear composition for the foot rest. In this regard, the clear composition for the foot rest may contain a melamine resin, an acrylic resin, a UV curing agent, a solvent, and $TiO_2$ powder in a content of 10% to 20% based on a total weight.

The clear composition for the foot rest may further contain a polyester resin in a content of 20% to 25% and an epoxy resin in a content of 10% to 20% based on a total weight.

In the removing of the surface foreign materials, the foot rest may be immersed into 30 g/L of trisodium phosphate ($Na_3PO_4$) for 30 to 45 seconds with a conducting amount of 2 A/dm and 3 to 5V.

In the performing of the anodizing treatment, the foot rest may be treated with 15 wt % of sulfuric acid ($H_2SO_4$)+0.2M oxalic acid dihydrate (($COOH)_2.2H_2O$) to have an anodizing thickness of 30 µm to 35 µm.

The method may further include performing a high-frequency heat treatment at a temperature of 120□ to 160□ after the performing of the electro-deposition coating with the clear for the foot rest.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DESCRIPTION OF SPECIFIC EMBODIMENTS

The following description is merely exemplary in nature and is not intended to limit the present disclosure, application, or uses. It should be understood that throughout the drawings, corresponding reference numerals indicate like or corresponding parts and features.

In the present disclosure, well-known functions or constructions will not be described in detail since they may unnecessarily obscure the understanding of the present invention.

Figure 1:
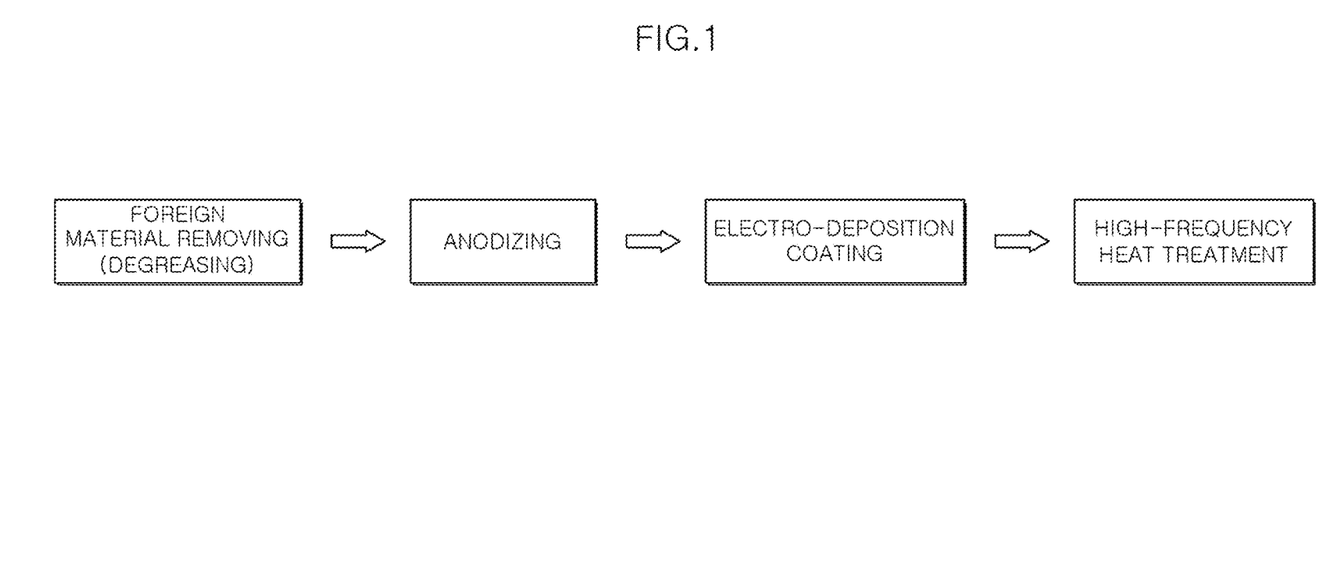
FIG. 1 is a view showing a coating method for an aluminum foot rest.

FIG. 1 is a view showing a coating method for an aluminum foot rest of the present disclosure.

Hereinafter, a clear composition for the aluminum foot rest and the coating method for the aluminum foot rest according to an aspect of the present disclosure will be described with reference to FIG. 1.

The clear composition for coating the foot rest of the aluminum material may be simultaneously applied to a pedal cover.

The aluminum foot rest may be manufactured by, for example, press-molding an aluminum plate of A5052 material, performing an anodizing treatment (i.e., a base coating) on the foot rest with an aim to increase durability against a dent and a scratch and performing a clear coating (i.e., a top coating) with an aim to increase water resistance and light resistance.

The clear composition of the present invention may be composed as arranged in Table 1 together with that of a prior art composition.

TABLE 1

| COMPONENT | CONTENT (%) | | REMARK |
| --- | --- | --- | --- |
| | PRIOR ART | PRESENT DISCLOSURE | |
| Cyclohexanone | 15 | 15 | solvent |
| Aromatic Solvent | 10 | 10 | solvent |
| melamine | 20 | 10 | clear curing agent |
| Acrylic (resin) | 50 | 25 | main component of clear |
| Polyester (resin) | — | 20-25 | main component of clear increasing dispersion and preventing aggregation |
| $TiO_2$ (titanium oxide fine powder) | — | 10-15 | increasing clear hardness |
| Epoxy Resin | — | 10-20 | increasing clear hardness and dispersion |
| UVcuring agent | 5 | 1↓ | increasing durability |

The clear composition for the foot rest of the present disclosure may add a titanium oxide (TiO) ingredient in a content of 10% to 15% thereto so as to increase hardness and strength of an aluminum material surface.

The $TiO_2$ ingredient may increase the hardness. It is, however, difficult to mix with an acrylic resin in the clear composition and thus, may not be uniformly dispersed but be aggregated. This may cause a surface color to turn into white.

Therefore, an epoxy resin and resin ingredients may be handled in order to protect an intrinsic color of the material as well as the hardness of the clear composition.

That is, the acrylic resin may be added in a content of 25%, a polyester resin may be added in a content of 20% to 25%, and an epoxy resin may be added in a content of 10% to 20% as compared to a conventional composition.

This may aid the $TiO_2$ ingredient to be dispersed uniformly on the surface.

The surface hardness and component reliability (durability) may be further increased through the uniformly dispersed particles.

The polyester resin added to increase the dispersibility and suppress the aggregation with $TiO_2$ powder may further enhance weather protection (sunlight and rainfall resistance) and accordingly, an ultraviolet (UV) curing agent may be added in a relatively small amount.

Accordingly, the UV curing agent may be added in a content of 1% or less.

A coating method of the clear composition for the foot rest having this composition may include: removing the surface foreign materials of the aluminum foot rest, such as degreasing; performing an anodizing treatment; performing an electro-deposition coating with the clear composition; and performing a high-frequency heat treatment as shown in FIG. 1.

Figure 2:
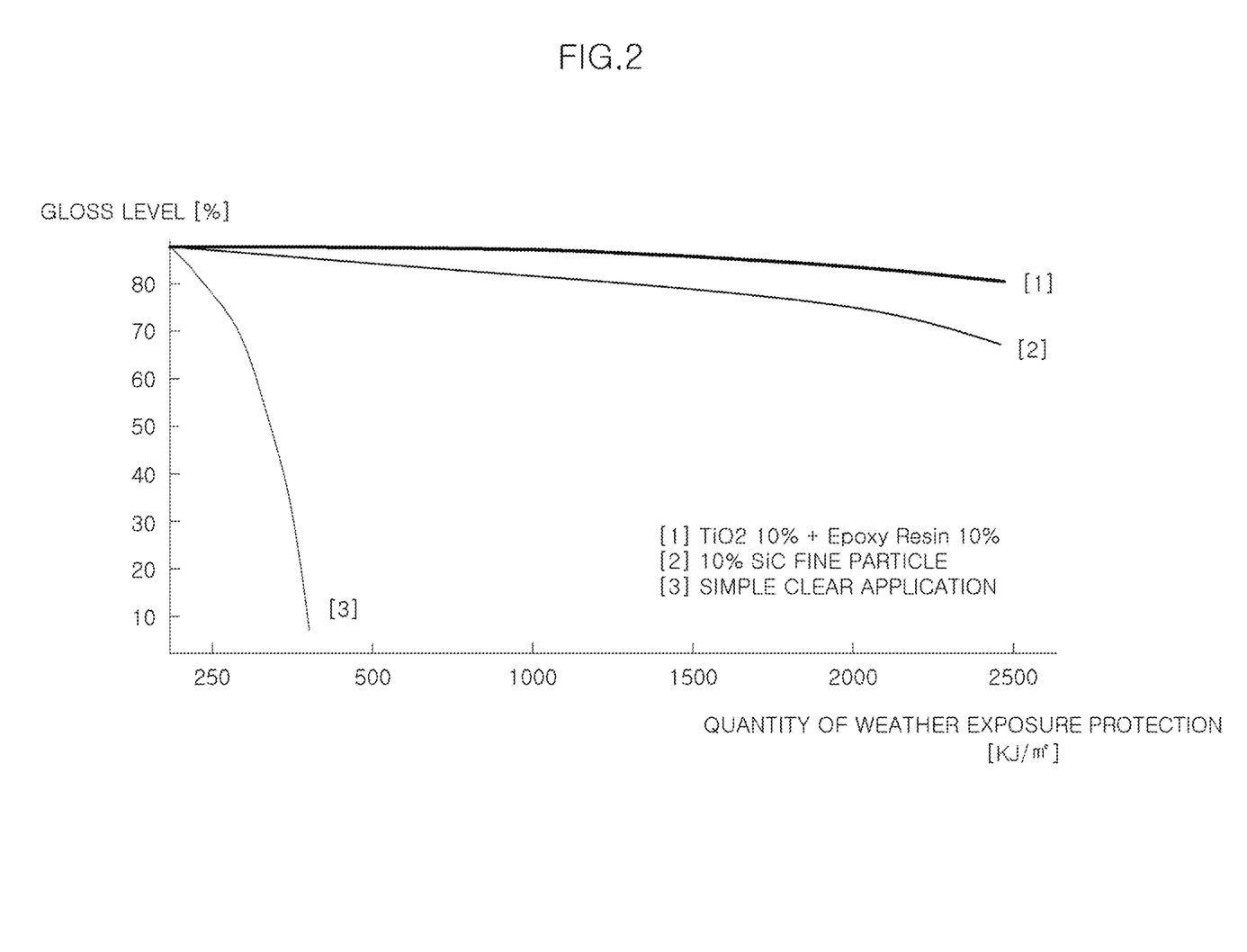
FIG. 2 is a view showing gloss levels associated with a clear compositions for an aluminum foot rest.

FIG. 2 is a view comparing gloss levels of clear compositions for an aluminum foot rest. The clear composition of the present disclosure is shown to have a superior gloss level to that of the prior art, potentially owing to the $TiO_2$ ingredient and the epoxy resin even under abrasion conditions.

Shown is a result for the clear composition containing the $TiO_2$ ingredient in a content of 10% and the epoxy resin in a content of 10%.

In the removing (degreasing) of the surface foreign materials, the foot rest may be immersed into 30 g/L of trisodium phosphate ($Na_3PO_4$) for 30 to 45 seconds with a conducting amount of 2 A/dm and 3 to 5V.

Figure 6:
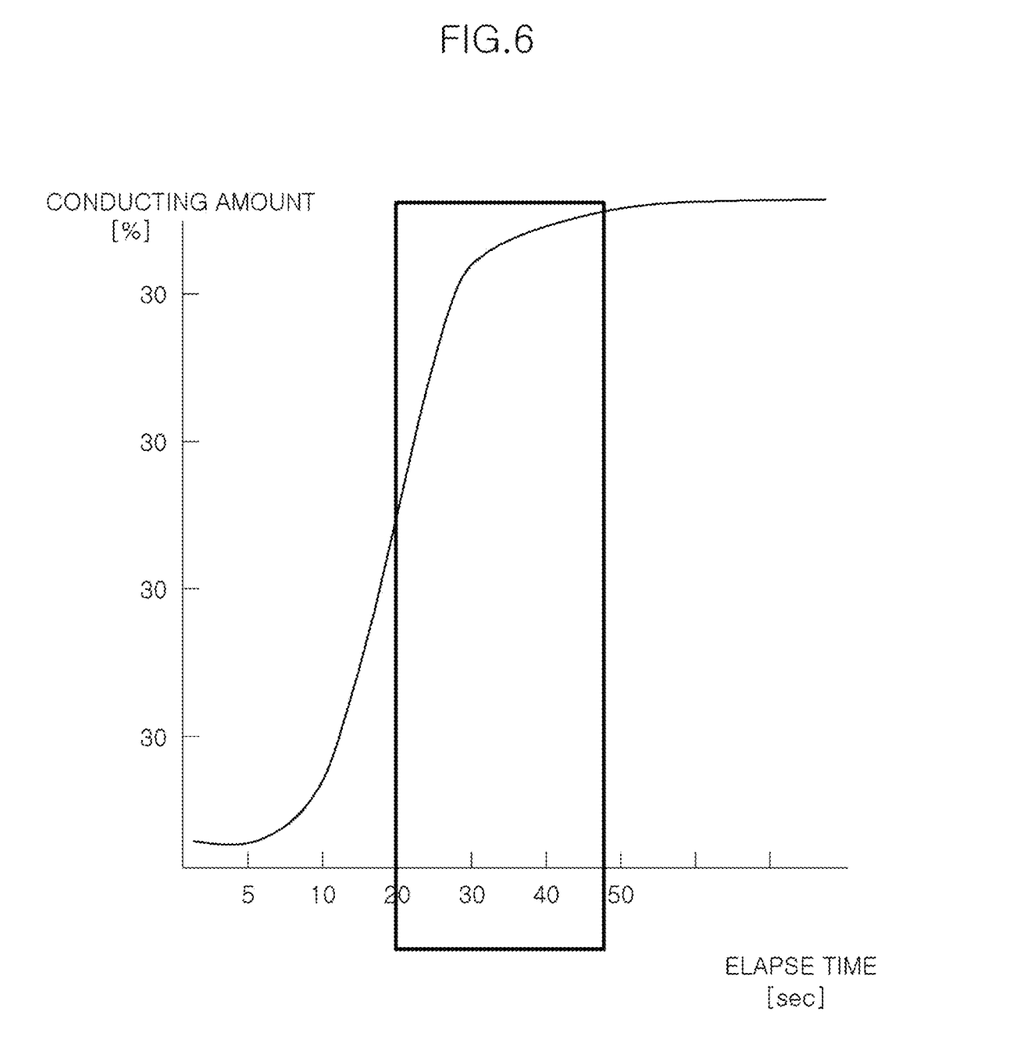
FIG. 6 is a view showing a conducting amount in a degreasing condition.

As shown in FIG. 6, the conducting amount (related to oil removal) may reach 87% in 30 seconds and 99% in 45 seconds after the immersion.

An anodizing treatment may be performed with 15 wt % of $H_2SO_4$+0.2M $(COOH)_2.2H_2O$, wherein the conditions of time, current and temperature may be 1,200 s, 5.2 A/dm and 150V, and 20 , respectively.

Figure 3:
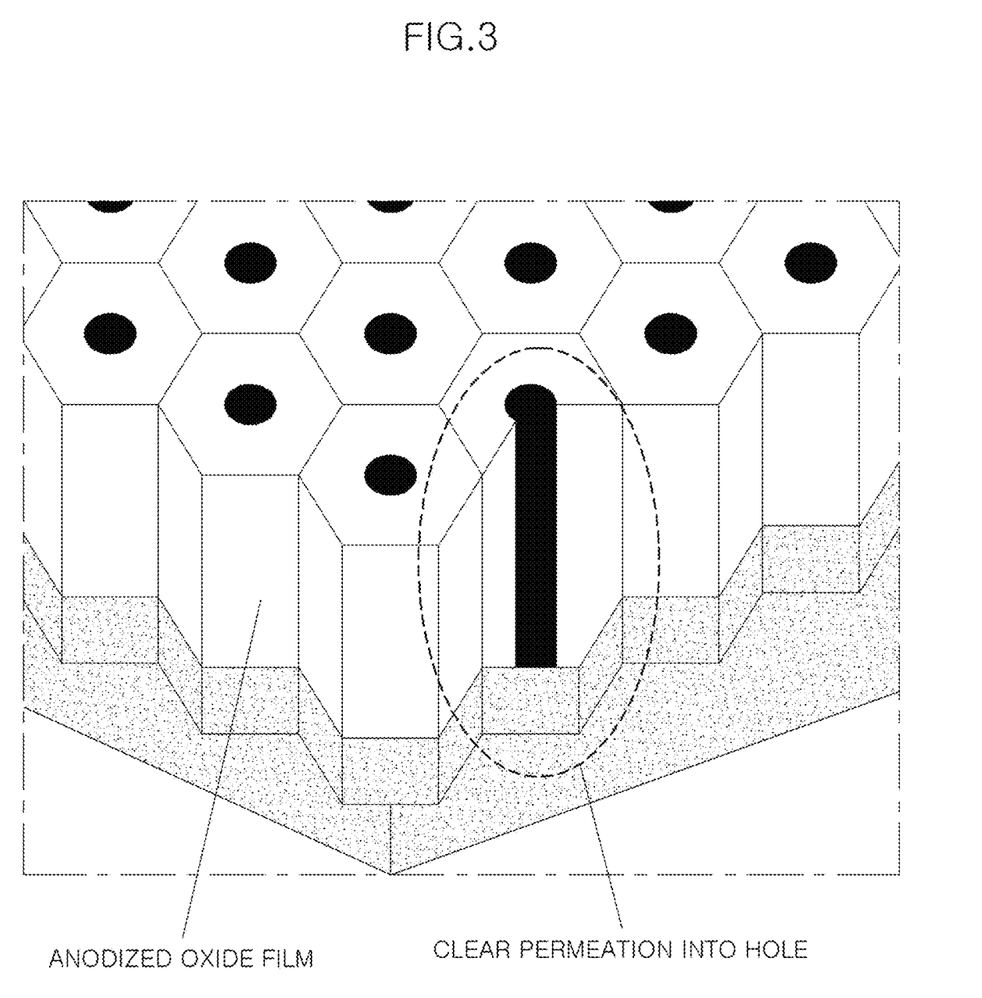
FIG. 3 is a fine view showing an anodized surface.
Figure 4:
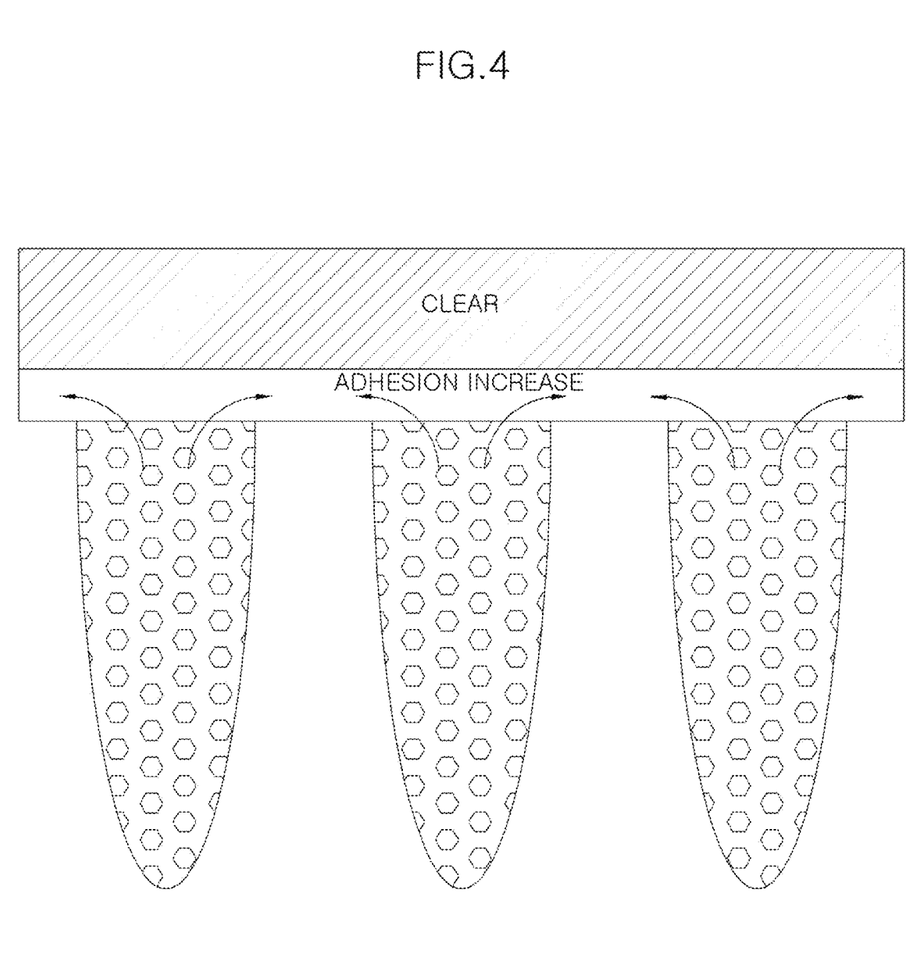
FIG. 4 is a view showing a cross-section of FIG. 3.

As shown in FIGS. 3 and 4, the anodizing treatment to aluminum raw material may increase undercut and surface areas by sealing holes therein.

That is, the clear composition may permeate inside the holes and increase the surface area (an interface) to increase adhesion between the aluminum material and the clear.

Figure 5:
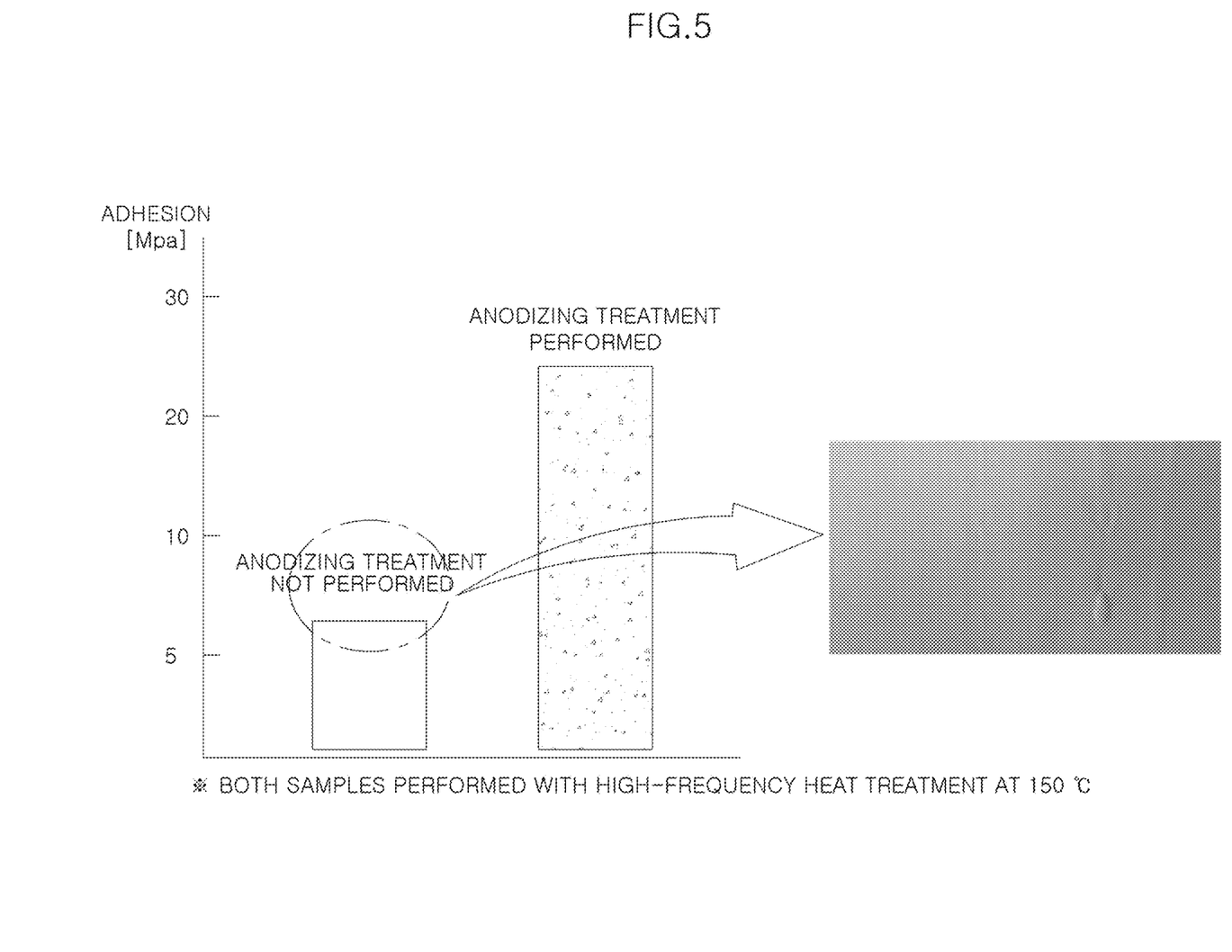
FIG. 5 is a view comparing surface adhesion associated with an anodizing treatment.

As shown in an experimental result of FIG. 5, adhesion strength may be increased from 6 MPa to 23 MPa.

When the surface is not anodized, the clear composition may drip down intermittently due to the polyester resin having a higher liquidity as compared to an acrylic resin. Defective percentage may be thus increased due to such a clear composition which fails to stably adhere to the surface and drip down.

Figure 7:
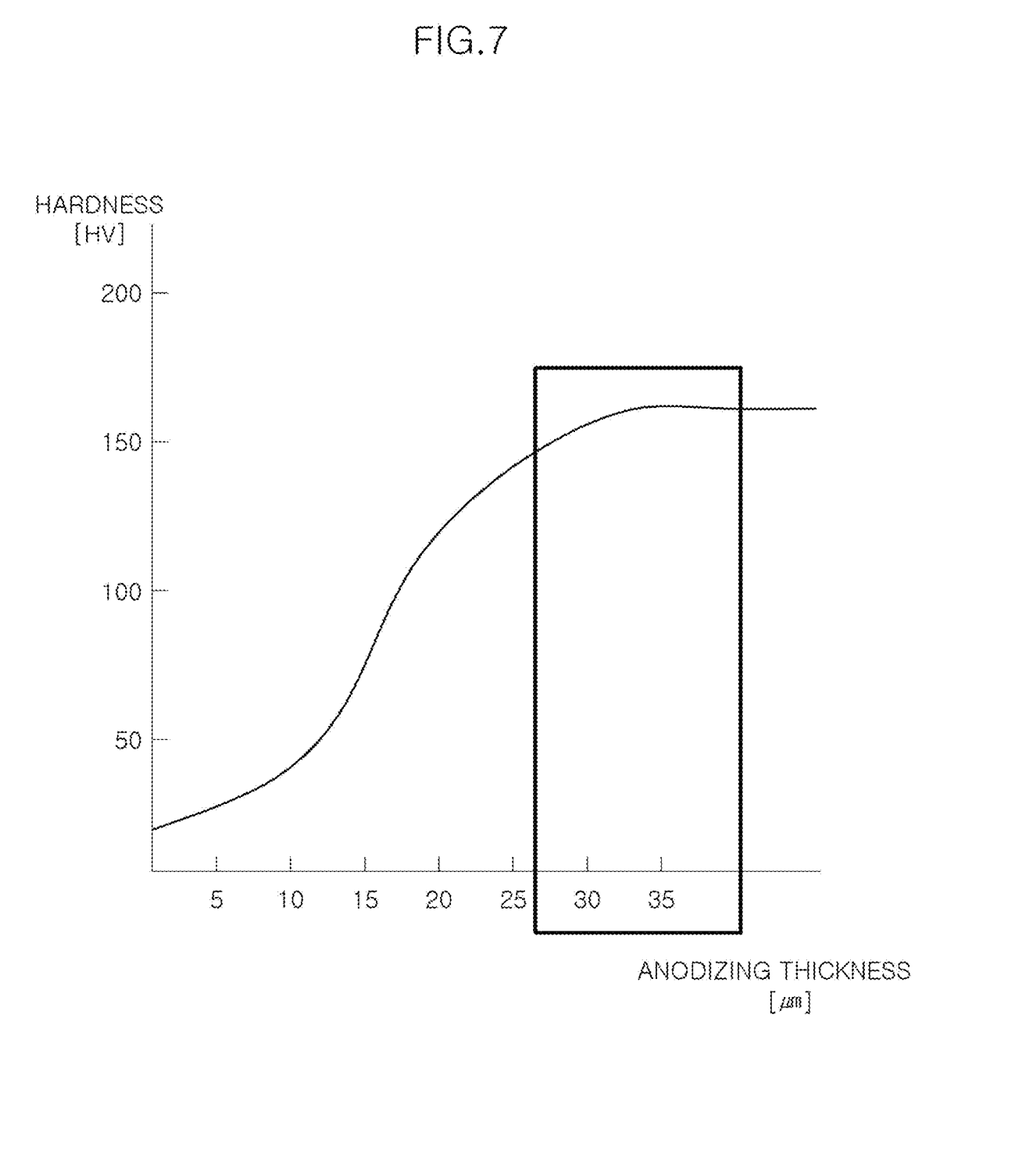
FIG. 7 is a view showing hardness of an anodizing thickness.

The anodizing treatment of the present disclosure added with oxalic acid may increase adhesion strength. As shown in FIG. 7, hardness may increase depending on an anodizing thickness. It is shown that the anodizing thickness can reach 30 μm thick when the anodizing treatment is performed for 1,200 seconds, and an increased effect of the hardened clear composition may become less significant when the anodizing thickness is 35 μm thick or more.

That is, the clear composition of the present invention can resolve the $TiO_2$ aggregation with the anodizing treatment and also improved adhesion, deficiency of which may be caused by the liquidity.

Figure 8:
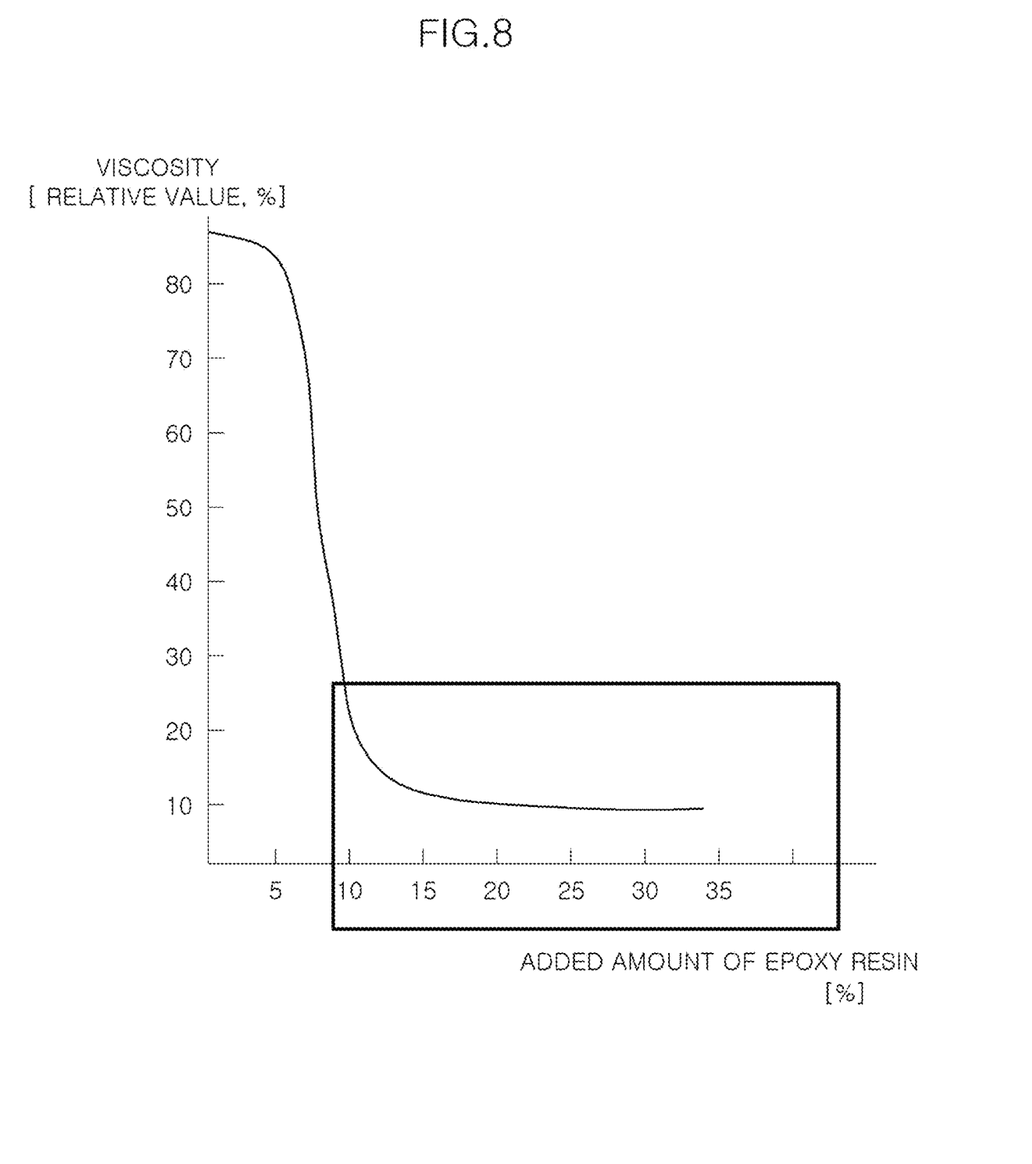
FIG. 8 is a view showing viscosity of an added amount of an epoxy resin.

Next, FIG. 8 is a view showing viscosity depending on an added amount of an epoxy resin. The clear composition may include an epoxy resin in a content of 10% to 20% in order to limit viscosity being increased by the aggregation when $TiO_2$ particles are injected.

As shown, liquidity may be increased by 87% when the epoxy resin is added in a content of 10%; by 90%, when added in a content of 15% or more; and no more increase, when added in a content of 20% or more. The viscosity test is made based on DIN4 standard viscometry.

Figure 9:
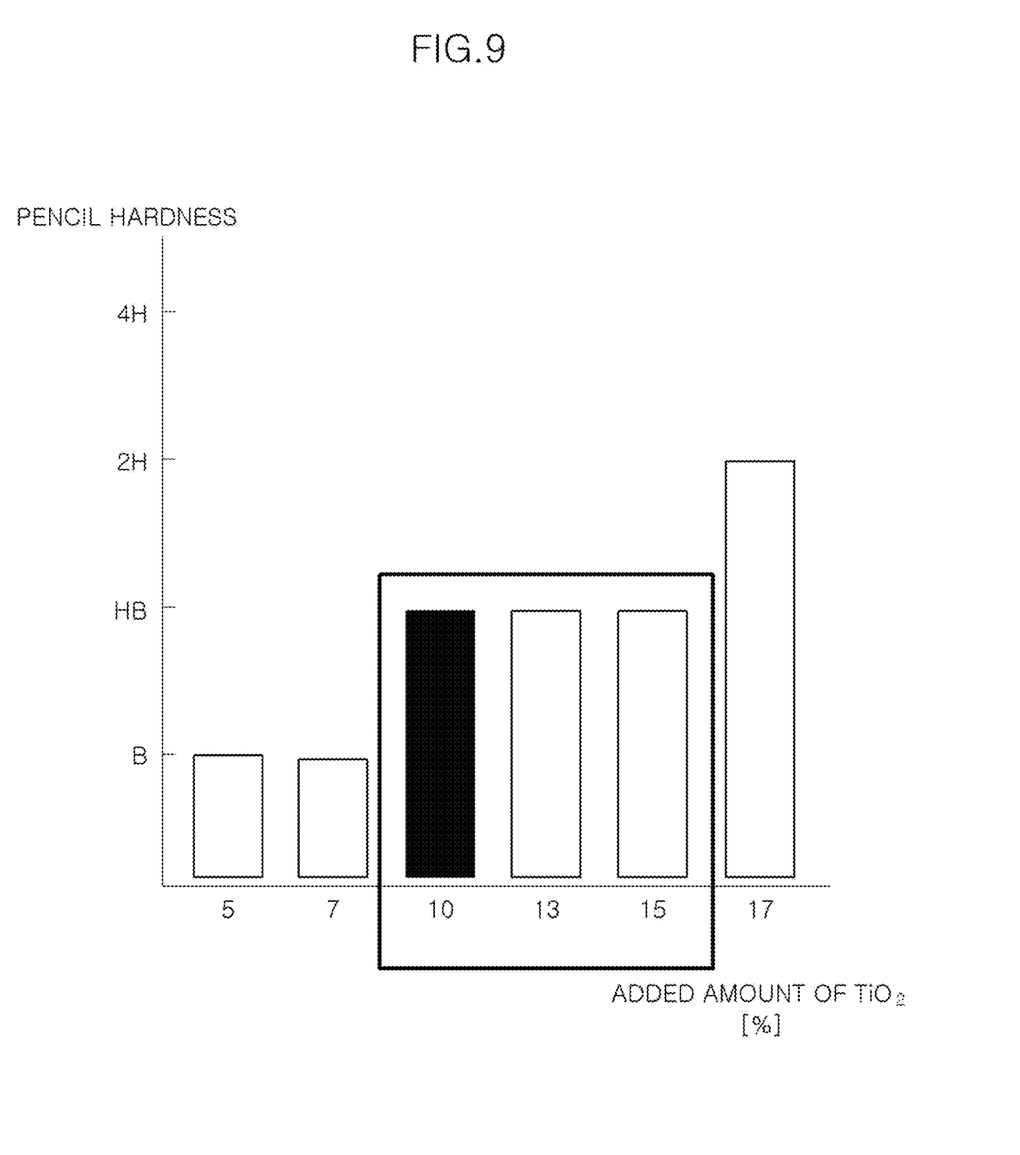
FIG. 9 is a view showing hardness associated with an added $TiO_2$ amount.

FIG. 9 is a view showing hardness depending on an added TiO$_2$ amount. The hardness of the clear composition may be increased by TiO$_2$ ingredient added in a content of 10% to 15%.

As shown, the TiO$_2$ ingredient added in a content of 10% may display an effect increasing hardness from B to HB level. The TiO$_2$ ingredient may be added in a content of up to and including 15%, as TiO$_2$ added in a content of 17% may increase the hardness, but with degraded quality due to particle aggregation and decreased transparency due to the particles excessively contained.

The coating method may further improve the clear composition adhesion strength by performing a high-frequency heat treatment after the performing of an electro-deposition coating with the clear composition.

Figure 10:
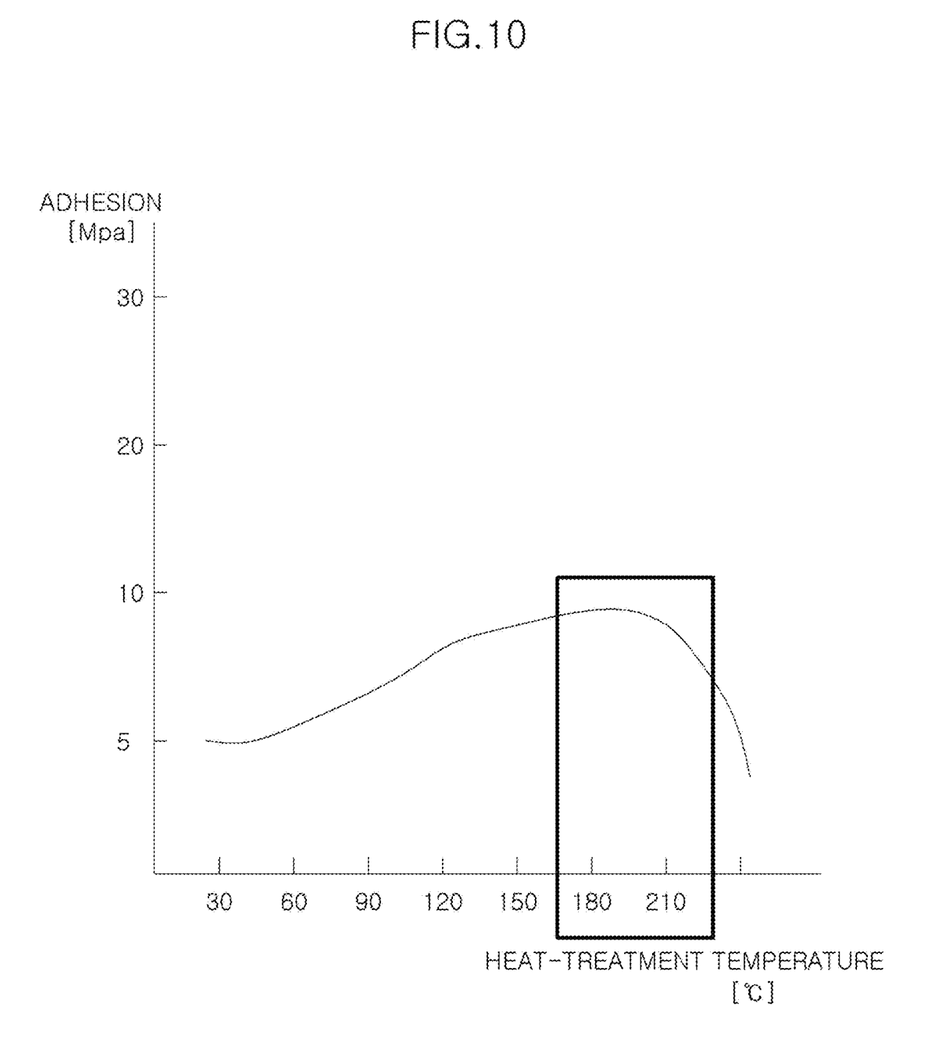
FIG. 10 is a view showing adhesion strength of a conventional clear associated with a temperature of a high-frequency heat treatment.
Figure 11:
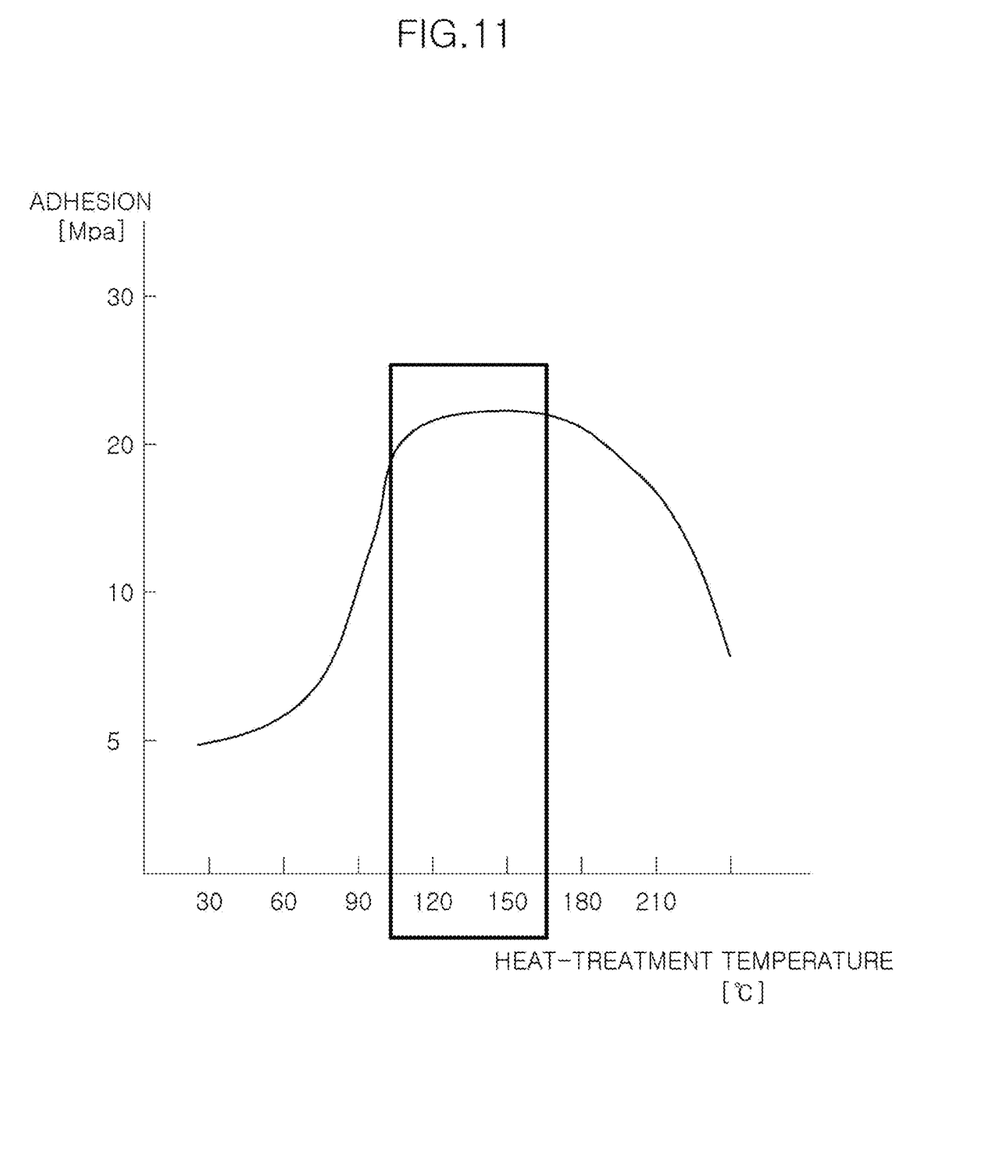
FIG. 11 is a view showing adhesion strength of a clear of the present invention associated with a temperature of the high-frequency heat treatment.

FIG. 10 is a view showing adhesion strength of a conventional clear coating depending on a temperature of a high-frequency heat treatment and FIG. 11 is a view showing adhesion strength of a clear composition of the present disclosure associated with a temperature of the high-frequency heat treatment.

As shown in FIG. 10, when a conventional clear composition is coated and performed with a high-frequency heat treatment, adhesion strength thereof may reach 10 MPa at a temperature of 180□, which is an insignificant increase as compared to the initial adhesion.

Whereas, as shown in FIG. 11, when the clear composition of the present disclosure is performed with the high-frequency heat treatment, the adhesion strength thereof may reach 21 MPa at the temperature of 120□, which is an increase by about 400%.

However, the adhesion strength may deteriorate in adhesion properties in the case of an over hardened surface at a temperature of 160□ or more.

Next, the clear composition of the present disclosure may enhance weather protection (sunlight and rainfall resistance) by adding a polyester resin which increases the dispersibility and suppresses the aggregation with TiO$_2$ powder thereto and accordingly, an ultraviolet (UV) curing agent may be added in a small amount.

Figure 12:
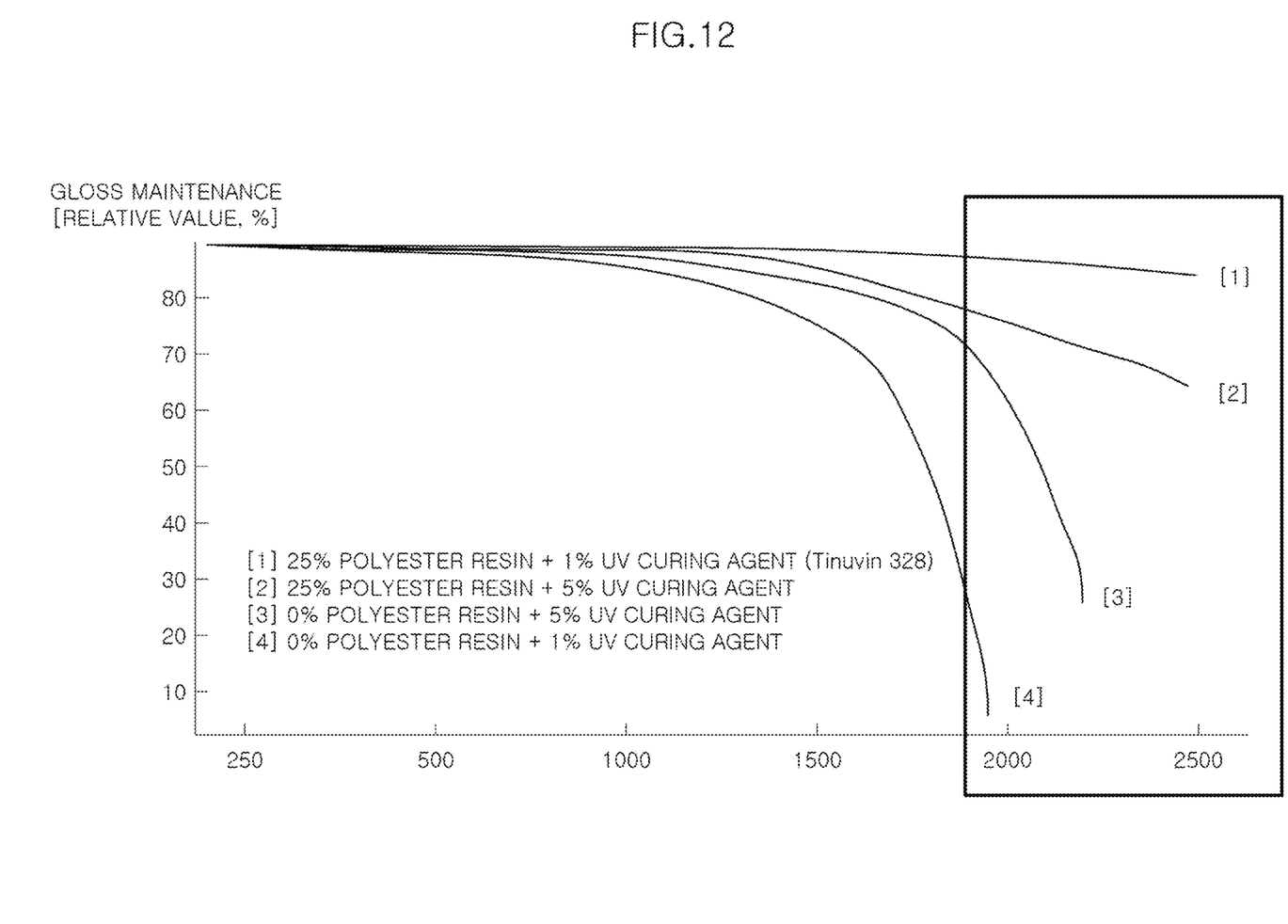
FIG. 12 is a view comparing quantity of weather exposure protection maintaining a gloss.

FIG. 12 is a view comparing quantity of weather exposure protection which maintains a gloss. As shown, when a polyester resin is added in a content of 25%, the UV curing agent may be dispersed uniformly due to the dispersibility of the resin and thus, may be capable of securing a gloss maintenance percentage to a high degree even when added in a content of 1%.

Therefore, the UV curing agent may be added in a content of 1% or less. On the contrary, a side effect may occur due to the aggregation with the TiO$_2$ particles when the UV curing agent is added in a content of 5%.

A conventional clear composition with acrylic resin added in a content of 50% may improve weather protection due to an added amount of the UV curing agent. The conventional clear composition may be, however, difficult to have a relatively uniformed dispersion and may show a declined durability under a condition of 2,000 KJ/m$^2$ exposure or more.

Following Table 2 is a result of a durable reliability test.

TABLE 2

Figure 13:
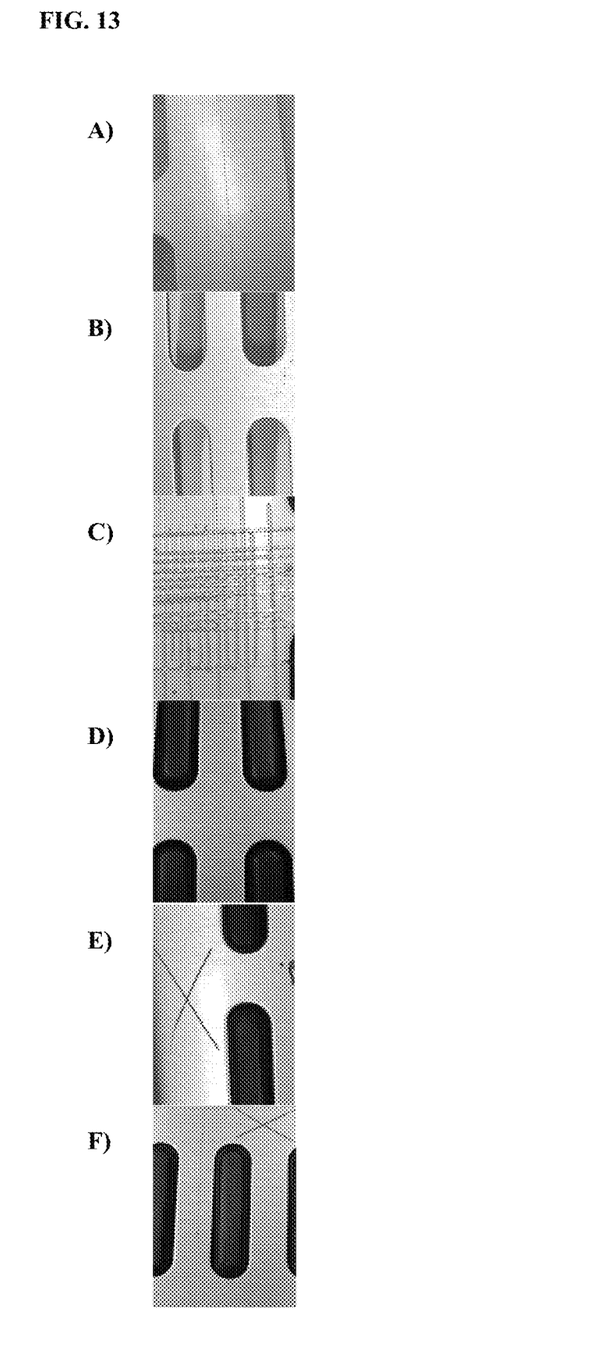
FIG. 13 is a series of photographs of the results of durability testing.

| TEST | | TEST RESULT | CORRESPONDING PHOTO |
|---|---|---|---|
| SCRATCH RESISTANCE | insignificant powder occur after a sapphire tip scratch on visible observation | OK | FIG. 13A |
| LIGHT RESISTANCE | no discoloration at 84 MJ exposure | OK | FIG. 13B |
| ADHESION STRENGTH | no peel-off from tested checkerboard | OK | FIG. 13C |
| BASE RESISTANCE | neither discoloration nor swelling with 0.1N NaOH injected | OK | FIG. 13D |
| WATER RESISTANCE | neither discoloration nor swelling in warm water immersion at a temperature of 40□ for 720 hours (Hr) | OK | FIG. 13E |
| CORROSION RESISTANCE | neither discoloration nor swelling in spraying salt water for 600 Hr | OK | FIG. 13F |

In the clear composition for the aluminum foot rest of the present disclosure, the added epoxy resin and other ingredients may improve dispersibility, which increases transparency as compared to the prior art and thereby, effectively shows an advantage of the aluminum material.

The anodizing treatment may further enhance the adhesion to the aluminum material.

The TiO$_2$ ingredient may further increase the hardness of the clear and thereby, enhance durable reliability.

The clear composition may also have excellent weather resistance against sunlight, rainfall and the like.

Although the present invention has been described with reference to the accompanying drawings, those skilled in the art will appreciate that the present disclosure is not limited to the examples described above, but may be variously modified and altered without the spirit and scope

What is claimed is:

1. A clear composition for an aluminum foot rest, comprising:
    a melamine resin, an acrylic resin, an ultraviolet (UV) curing agent, a solvent, and titanium oxide (TiO$_2$) powder in a content of 10% to 20% based on a total weight; and
    an epoxy resin in a content of 10% to 20% based on a total weight.

2. The clear composition for an aluminum foot rest of claim 1, further comprising:
    a polyester resin in a content of 20% to 25% based on a total weight.

3. The clear composition for an aluminum foot rest of claim 2, wherein the ultraviolet (UV) curing agent has a content of 1% or less based on a total weight.

4. The clear composition for an aluminum foot rest of claim 2, wherein the acrylic resin has a content of 25% based on a total weight.

* * * * *